USOO5088022A

United States Patent [19]
Iwata

[11] Patent Number: 5,088,022
[45] Date of Patent: Feb. 11, 1992

[54] DIAGNOSTIC SYSTEM HAVING MULTI-LEVEL PORT AND FLEXIBLE INTERFACE WITH A MAIN PORT CONTROL UNIT AND PLURALITY OF ORDER PORT AND PRIMARY PORT CONTROL UNITS

[75] Inventor: Jun Iwata, Tokyo, Japan

[73] Assignee: NEC Corporation, Tokyo, Japan

[21] Appl. No.: 379,779

[22] Filed: Jul. 14, 1989

[30] Foreign Application Priority Data

Jul. 16, 1988 [JP] Japan ................. 63-176236

[51] Int. Cl.⁵ ........................................... G06F 13/12
[52] U.S. Cl. ..................... 395/325; 364/229;
364/229.5; 364/239.9; 364/241.9; 364/927.92;
364/927.94; 364/927.95; 364/927.98;
364/940.61; 364/941.7; 364/DIG. 1; 364/DIG. 2

[58] Field of Search ................. 364/200, 900

[56] References Cited
U.S. PATENT DOCUMENTS

| | | | |
|---|---|---|---|
| 4,439,826 | 3/1984 | Lawrence et al. | 364/200 |
| 4,701,845 | 10/1987 | Andreasen et al. | 364/200 |
| 4,716,523 | 12/1987 | Burrus, Jr. et al. | 364/200 |
| 4,751,634 | 6/1988 | Burrus, Jr. et al. | 364/200 |
| 4,935,868 | 6/1990 | Dulac | 364/200 |

*Primary Examiner*—Thomas C. Lee
*Assistant Examiner*—Krisna Lim
*Attorney, Agent, or Firm*—Foley & Lardner

[57] ABSTRACT

In a system for diagnosing information processor system units by diagnostic processor connected to said system units through an interface, in order to meet desire of increase and decrease of the system units, the interface comprises a plurality of port control units which have a circuit formation and are readily disconnected and connected thereto so that number of port controllers can be readily increased or decreased. The system units are classified into a plurality of primary groups each having a predetermined number (m) of system units, the primary groups being classified into a plurality of secondary groups each having m primary groups, thus, groups of a low order being classified into groups of a higher order so that the group number of the maximum order becomes less than m. The port control units are corresponding to the order groups and are connected to one another in such a manner that lower order port control units are connected to higher order port control units. The port control units of the maximum order are connected to the diagnostic processor through a similar main port control unit and each of the primary control unit are connected to the system units. A specific one of the system unit numbers is supplied from the diagnostic processor to the primary port control units through port control units of the higher order control units so as to select a specific one of system units as a current diagnosed unit.

4 Claims, 3 Drawing Sheets

| DIAGNOSED UNIT NUMBER BIT | | | | | | | | DIAGNOSED UNIT |
|---|---|---|---|---|---|---|---|---|
| 0 | 1 | 2 | 3 | 4 | 5 | 6 | 7 | |
| 0 | 0 | 0 | 0 | 0 | 0 | 0 | 0 | MAIN STORAGE UNIT 12 |
| 0 | 0 | 0 | 0 | 0 | 0 | 0 | 1 | SYSTEM CONTROL UNIT |
| 0 | 0 | 0 | 0 | 0 | 0 | 1 | 0 | EXECUTING PROCESSOR UNIT 141 |
| 0 | 0 | 0 | 0 | 0 | 0 | 1 | 1 | 142 |
| 0 | 0 | 0 | 0 | 0 | 1 | 0 | 0 | 143 |
| 0 | 0 | 0 | 0 | 0 | 1 | 0 | 1 | 144 |
| 0 | 0 | 0 | 0 | 0 | 1 | 1 | 0 | 145 |
| 0 | 0 | 0 | 0 | 0 | 1 | 1 | 1 | 146 |
| 0 | 0 | 0 | 0 | 1 | 0 | 0 | 0 | NOT USED |
| ⋮ | ⋮ | ⋮ | ⋮ | ⋮ | ⋮ | ⋮ | ⋮ | ⋮ |
| 1 | 1 | 1 | 1 | 1 | 1 | 1 | 1 | NOT USED |

FIG. 3

DIAGNOSTIC SYSTEM HAVING MULTI-LEVEL PORT AND FLEXIBLE INTERFACE WITH A MAIN PORT CONTROL UNIT AND PLURALITY OF ORDER PORT AND PRIMARY PORT CONTROL UNITS

BACKGROUND OF THE INVENTION

1. Field of the Invention

The present invention relates to an information processing system and, in particular, to a system for diagnosing diagnosed units such as a main storage unit, a system control unit, and executing units which implement the information processing system.

2. Description of the Prior Art

In the prior art, a diagnostic system comprises a diagnostic processor and an interface connected to the diagnostic processor and has been designed for diagnosing those units in a specific information processing system. Those diagnosed units are assigned with different unit numbers. The diagnostic processor delivers a specific one of those unit numbers and a diagnosis indicating data signal to the interface. The interface receives the specific unit numbers and the diagnosis indicating data signal and delivers the diagnosis indicating data signal to those diagnosed units. Upon receiving the diagnosis indicating data signal, the diagnosed units transmit diagnosing data sets to the interface. Then, the interface selects a specific one of the diagnostic data sets from the specific diagnosed unit by reference of the specific unit number and delivers the specific diagnostic data set to the diagnostic processor. Therefore, the diagnostic processor diagnoses the specific diagnosed unit by use of the specific diagnostic data set.

The interface comprises a selector and a plurality of ports which are equal to the number of the diagnosed units. The ports are connected to the diagnostic processor and also connected to the diagnosed units. The ports receive the diagnosis indicating data signal from the diagnostic processor and deliver it to the diagnosed units. The ports are also connected to the selector and deliver the diagnostic data sets from the diagnosed units to the selector. The selector is also connected to the diagnostic processor and receives the specific unit number. The selector selects the specific diagnostic data set from the diagnostic data sets by reference to the specific unit number and delivers the specific diagnostic data set to the diagnostic processor.

Since the known diagnostic system is designed adaptable for a specific information processing system, it cannot be used for diagnosing another information system having a different number of diagnosed units. For example, the diagnostic system cannot diagnose an increased number of diagnosed units in the other information processing system.

SUMMARY OF THE INVENTION

Therefore, it is an object of the present invention to provide a flexible diagnostic system which is adaptable for diagnosing various scales of information processing systems.

The present invention is applicable to a diagnostic system for diagnosing a plurality of (N which is an integer of at least 2 or more) diagnosed units which implement an information processing system, the plurality of diagnosed units being assigned with different unit numbers, respectively. The diagnostic system comprises a diagnostic processor for delivering a specific one of the unit numbers and a diagnosis indicating data signal to receive a specific diagnostic data set from a specific one of the diagnosed units corresponding to the specific unit number and for processing the specific diagnostic data set to diagnose the specific diagnosed unit, and interface means for delivering the diagnosis indicating data signal to the plurality of diagnosed units to receive diagnostic data sets from the plurality of diagnosed units and for selecting, as the specific diagnostic data set, one of the diagnostic data sets from the specific diagnosed unit to deliver the specific diagnostic data set to the diagnostic processor by use of the specific unit number. According to the present invention, the N diagnosed units are classified into $N_1$ ($N/m \leq N_1 < N/m+1$, Nl being an integer and m being an integer of 2 or more) primary groups which have different primary group numbers, each of the primary groups having one or more but not larger than m diagnosed units which have different group elementary numbers, generally $N_{i-1}$ (i−1)-th (i being an integer) order groups being classified into $N_i$ ($N_{i-1}/m \leq N_i < (-N_{ip31}$ 1/m+1), $N_i$ being an integer) i-th order groups which have different i-th order group numbers, $N_k$ ($N_k = N_i$, $2 \leq N_k m$) k-th order groups having different k-th order group numbers when i=k, each of the unit numbers comprising the elementary number, the primary number, the (i−1)-th order group number, the i-th order group number and the k-th order group number. The interface means comprising: $N_1$ primary port control units corresponding to the $N_1$ primary part groups and each of the $N_1$ primary control units coupled to elementary diagnosed units in each of the primary groups; generally $N_{i-1}$ (i−1)-th order port control units corresponding to the $N_{i-1}$ (i−1)-th order groups and being classified into $N_i$ i-th order controller groups corresponding to the $N_i$ i-th order groups; $N_i$ i-th order port control units each coupled to the (i−1)-th order port control units in each of the $N_i$ i-th order controller groups; $N_k$ k-th order port control units corresponding to the $N_k$ k-th order groups; and a main port control unit coupled to the $N_k$ k-th order port control units, the main port control unit being coupled to the diagnostic processor for receiving a pair signal of the specific unit number and the diagnosis indicating data signal, the pair signal being delivered from the main port control unit to the diagnosed units through the k-th order port control units, generally the i-th port control units and the primary port control units, the specific diagnostic data set being delivered from the specific diagnosed unit to the diagnostic processor through one of the primary port control units, generally one of the (i−1)-th order port control units, one of the i-th port control units, one of the k-th order port control units, and the main port control unit.

Each of the primary control units, each of the (i−1)-th order control units, each of the i-th order control units, and each of the k-th order control units and the main control units have a similar circuit formation which comprises a first port for receiving the pair signal and for delivering a selected diagnostic data set, m second ports connected to the first port for delivering the pair signal therethrough and for receiving m diagnostic data sets, and a selector coupled with the m second ports and the first port for selecting one from the m diagnostic data sets as the selected diagnostic data set with reference to the specific unit number.

In an aspect of the present invention, N is 2 or more but not larger than m, and the $N_k$ k-th groups being m groups comprising m different diagnostic units, respectively.

Each of the primary control units selects a particular one of the diagnostic data sets from the diagnosed units in the primary group with reference to the group elementary number in the specific unit number to deliver the particular diagnostic data set, generally each of the i-th order port control units selecting a particular one of i-th order port data sets delivered from (i−1)-th order port control units with reference to the (i−1)-th order group number in the specific unit number to deliver the particular i-th order port data set, the main port control unit selecting a particular one of main port data sets delivered from k-th order port control circuits with reference to the k-th order group number in the specific unit number to deliver the particular main port data sets as the specific diagnostic data set.

BRIEF DESCRIPTION OF THE DRAWINGS

FIG. 3 is a view illustrating unit numbers of the diagnosed units in the system of FIG. 2.

DESCRIPTION OF PREFERRED EMBODIMENTS

Prior to description of preferred embodiments of the present invention, a known diagnostic system will be described with reference to FIG. 1 in order to better understanding the present invention.

Figure 1:
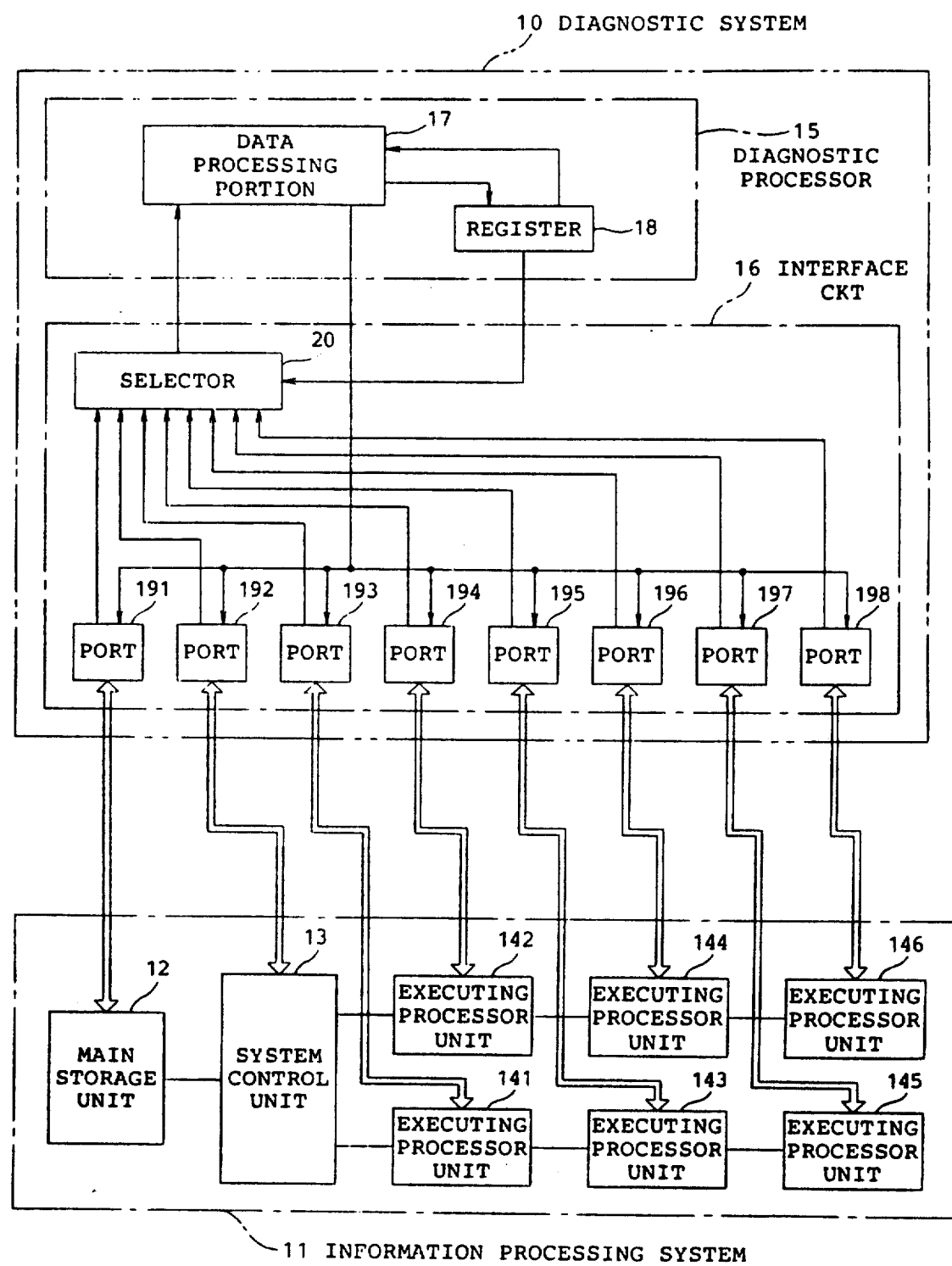
FIG. 1 is a diagram view illustrating a known diagnostic system together with an information system to be diagnosed.

Referring to FIG. 1, a diagnostic system 10 is shown to diagnose an information processing system 11. The information processing system 11 comprises a main storage unit 12, a system control unit 13, and six executing processor units 141 to 146 which are units to be diagnosed by the diagnostic system 10.

The diagnostic system 10 comprises a diagnostic processor 15 and an interface circuit 16 connected to the diagnostic processor 15.

The diagnostic processor 15 comprises a data processing portion 17 and a unit number register 18. The data processing portion 17 delivers a diagnosis indicating data signal and a specific unit number for indicating a specific one of the diagnosed units 12, 13, 141-145, and 146. The specific unit number is held in the unit number register 18. The data processing portion 17 processes a specific diagnostic data set delivered from the interface circuit 16 to diagnose the specific diagnosed unit.

The interface circuit 16 comprises eight (8) ports 191 to 198 connected to the data processing portion 17 so as to receive the diagnosis indicating data signal and a selector 20 connected to the data processing portion 17, the unit number register 18, and all of the ports 191-198. The ports 191 to 198 are connected to the diagnosed units 12, 13, 141-145 and 146 in the information processing system 11.

In order to diagnose a specific one of the diagnosed units 12, 13, 141-145 and 146 by the diagnostic system 10, the data processing portion 17 issues the specific unit number and the diagnosis indicating data signal. The specific unit number is registered in the unit number register 18 and is delivered therefrom to the selector. While, the diagnosis indicating data signal is supplied to all of those diagnosed units 12, 13, 141-145 and 146 through the ports 191 to 198. Responsive to the diagnosis indicating data signal, those diagnosed units 12, 13, 141-145 and 146 issue diagnostic data sets which are supplied to the selector 20 through the ports 191 to 198. The selector 20 selects a specific one of the diagnostic data sets corresponding to the specific diagnosed unit with reference to the specific unit number supplied from the unit number register 18. The specific diagnostic data set is delivered from the selector 20 to the data processing portion 17. The data processing portion 17 processes the specific diagnostic data set to diagnose the specific diagnosed unit.

The known diagnostic system is designed to diagnose the information processing system having a predetermined number of diagnosed units. That is, the number of ports 191 to 198 in the interface circuit 16 are equal to the number of the diagnosed units. Therefore, when one or more additional executing processor units are desired to be used in the information processing system, the diagnostic system cannot diagnose the additional executing processor units.

Figure 2:
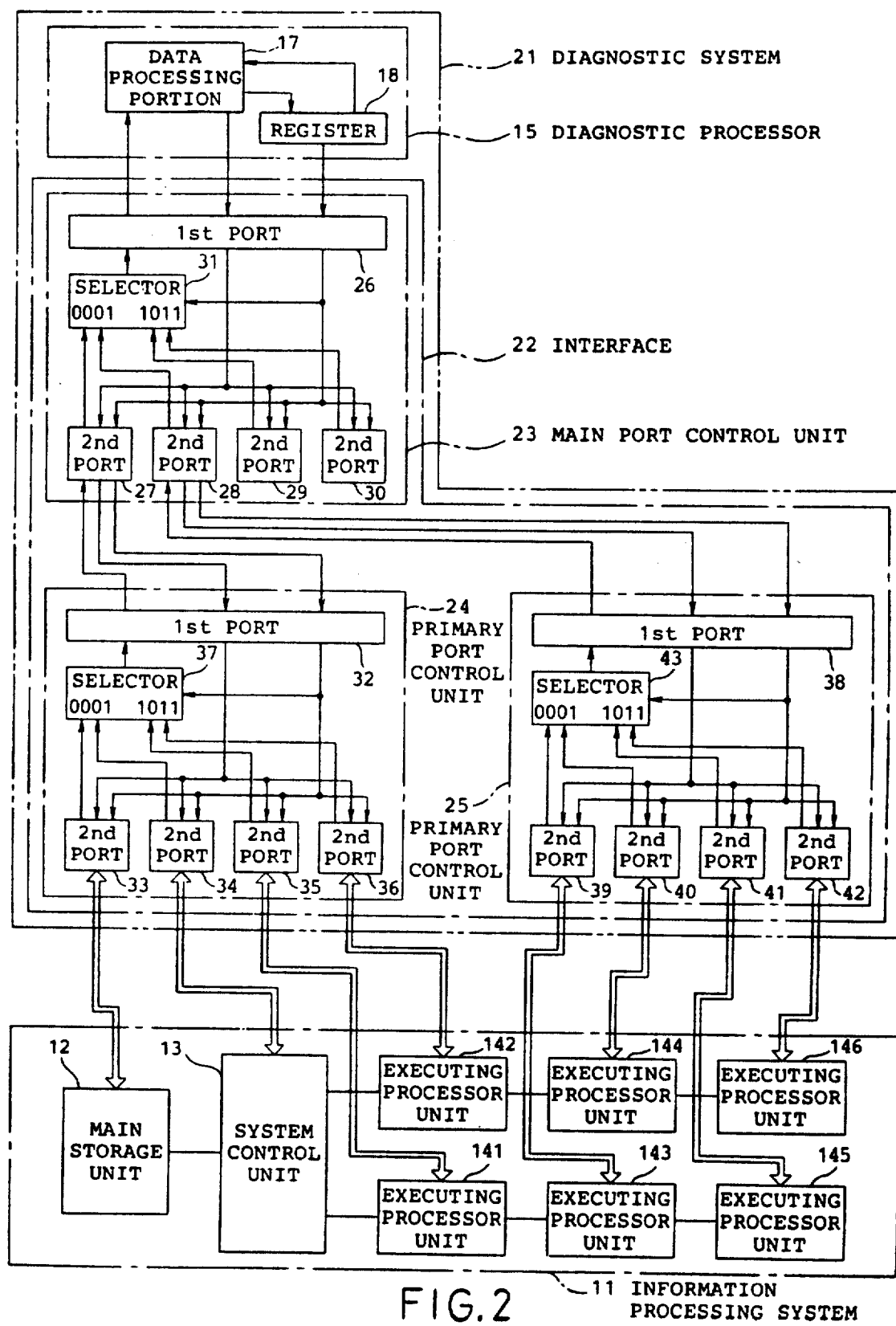
FIG. 2 is a diagram view illustrating a diagnostic system according to one embodiment of the present invention together with an information system to be diagnosed.

Referring to FIG. 2, a diagnostic system 20 according to an embodiment of the present invention is shown to diagnose an information processing unit 11 similar to that in FIG. 1. Therefore, the information processing system is shown with the same reference numerals as in FIG. 1.

The diagnostic system 21 comprises a diagnostic processor 15 similar to that in FIG. 1 and an interface 22. The diagnostic processor 15 comprises a data processing portion 17 and a unit number register 18 similar to those in FIG. 1. The interface 22 comprises a plurality of (three in the shown embodiment) port control units 23, 24 and 25 which are similar to each other in the circuit formation.

In the diagnostic system according to the present invention, the number of the port control units is determined by the number of the diagnosed units and assignment of unit numbers to the diagnosed units.

Now, assuming that there are N (N being an integer of 2 or more) diagnosed units, the N diagnosed units are classified into primary groups so that each of the primary groups has one or more but not more than a predetermined number m (m being 2 or more but not larger than N). That is, N diagnosed units are classified into $N_1$ ($N/m \leq N_1 N/m+1$, N1 being an integer) primary groups which have different primary group numbers. Group element numbers are assigned to the diagnosed units in each of the primary groups. Generally, $N_{i-1}$ (i−1)-th (i being an integer) order groups are classified into $N_i$ ($N_{i-1}/m \leq N_i < (N_{i-1}/m+1)$, $N_i$ being an integer) i-th order groups which have different i-th order group numbers. $N_k$ ($N_k = N_i$, $2 \leq N_k \leq m$) k-th order groups have different k-th order group numbers when i=k. Therefore, each of the unit numbers comprises the elementary number, the primary number, the (i−1)-th order group number, the i-th order group number and the k-th order group number. The port control units are provided to correspond to the primary, the (i−1)-th order, the i-th order, . . . , and k-th order groups, except a main port control unit. That is, the number of the port control units are determined by ($N_1 + \ldots + N_{i-1} + N_i + \ldots + N_k + 1$). In detail, the interface comprises:

$N_1$ primary port control units corresponding to the $N_1$ primary groups and each of the $N_1$ primary control units coupled to elementary diagnosed units in each of the primary groups;

generally $N_{i-1}$ (i−1)-th order port control units corresponding to the $N_{i-1}$ (i−1)-th order groups and being classified into $N_i$ i-th order controller groups corresponding to the $N_i$ i-th order groups;

$N_i$ i-th order port control units each coupled to the (i−1)th order port control units in each of the $N_i$ i-th order controller groups;

$N_k$ k-th order port control units corresponding to the $N_k$ k-th order groups; and a main port control unit coupled to the $N_k$ k-th order port control units, the main port control unit being coupled to the diagnostic processor for receiving a pair signal of the specific unit number and the diagnosis indicating data signal, the pair signal being delivered from the main port control unit to the diagnosed units through the k-th order port control units, generally the i-th port control units and the primary port control units, the specific diagnostic data set being delivered from the specific diagnosed unit to the diagnostic processor through one of the primary port control units, generally one of the (i−1)-th order port control units, one of the i-th port control units, one of the k-th order port control units, and the main port control unit.

Referring to FIG. 3, the diagnosed units are assigned with unit numbers represented by binary numbers of the 8 bit length. The 6th and 7th bits represent the group elementary number of each of diagnosed units in the primary group. The 4th and 5th bits represent the primary group numbers. The 2nd and 3rd bits represent the secondary group numbers and the 0-th and 1st bits represent the three-order (k=3) group numbers. That is, m is determined to be 4. It is possible to determine m to be any other number, for example, 16, if it is better to do so. Then, the 0-th, 1st, 2nd and 3rd bits represent the primary group numbers and the 4th, 5th, 6th, and 7th bits represent the group elementary numbers. It is needless to say that bit numbers can be increased. Since N=8 and m=4 in the shown embodiment, k=1, that is, $N_k = N_1 = 2$ and $N_2 = \ldots = N_i = \ldots = 0$. Therefore, the number of the port control units are three (3=2+1).

Returning to FIG. 2, the interface 22 comprises a main port control unit 23 and two primary control units 24 and 25. The main control unit 23 comprises a first port 26, a plurality of (m=4) second ports 27, 28, 29 and 30 each connected to the first port 26, and a selector 31 connected to the first port 26 and all of the second ports 26 through 30. The first port 26 is connected to the diagnostic processor 21 to receive the diagnosis indicating data signal and the specific unit number from the data processing portion 17 and the unit number register 18. The diagnosis indicating data signal and the specific unit number are supplied to all of the second ports 26 through 30. The selector 26 is connected to the first port 26 so that the k-th order group number (the primary group number in this embodiment) in the specific unit number is supplied to the selector 30 as a specific primary group number. The selector 26 selects a specific one of main port data sets from the second ports 27 through 30 with reference to the specific primary group number and delivers the specific main port data set to the diagnostic processor through the first port 26 as the specific diagnostic data set.

Two primary port control circuits 24 and 25 are connected to two second ports 27 and 28. The primary port control unit 24 comprises a first port 32, four (m=4) second ports 33 through 36 and a selector 37 which are connected to each other in the similar manner as in the main port control unit 23. The first port 32 is connected to the second port 27 in the main port control unit 23 to receive the diagnosis indicating data set and the specific unit number. The diagnosis indicating data signal and the specific unit number are supplied to all of the second ports 33 through 36. The selector 37 is connected to the first port 32 so that the group elementary number in the specific unit number is supplied to the selector 37 as a specific group elementary number. The selector 37 selects a particular one of diagnostic data sets from the second ports 33 through 36 with reference to the specific group elementary number and delivers the particular diagnostic data set to the main port control unit 23 through the first port 32 as one of the main port data sets. The second ports 33 through 36 are connected to diagnosed units 12, 13, 141 and 142 in one of the two primary groups. The diagnosed units 12, 13, 141 and 142 deliver the diagnostic data sets to the second ports 33 through 36.

The other primary port control unit 25 is formed in the similar manner as the primary port control unit 24 and comprises a first port 38, four (m=4) second ports 39 through 42 and a selector 43 which are connected to each other in the similar manner as in the primary port control unit 24. The first port 38 is connected to the second port 28 in the main port control unit 23 to receive the diagnosis indicating data set and the specific unit number. The diagnosis indicating data signal and the specific unit number are supplied to all of the second ports 39 through 42. The selector 43 is connected to the first port 38 so that the group elementary number in the specific unit number is supplied to the selector 43 as a specific group elementary number. The selector 43 selects a particular one of diagnostic data sets from the second ports 39 through 42 with reference to the specific group elementary number and delivers the particular diagnostic data set to the main port control unit 23 through the first port 38 as another of the main port data sets. The second ports 39 through 42 are connected to diagnosed units 143 through 146 in another of the two primary groups. The diagnosed units 143 through 146 deliver the diagnostic data sets to the second ports 39 through 42.

In operation, assuming that the data processing portion 17 issues the diagnosis indicating data signal and the unit number of the system control unit 13 as the specific unit number, the diagnosis indicating data signal and the specific unit number are supplied to the main port control unit 23 and the two primary control units 24 and 25. The specific unit number is "00000001" referring to FIG. 3. That is, the primary group number is "00" and the elementary number is "01". The diagnosis indicating data signal is then supplied to the diagnosed units 12, 13, 141-145 and 146 from the primary port control units 24 and 25. Therefore, the diagnosed units 12, 13, 141-145 and 146 supply diagnostic data sets to the second ports 33 through 36 and 39 through 42.

Since the selectors 37 and 43 are supplied with "01" as the specific elementary number, the selector 37 selects the diagnostic data set from the system control unit 13 as the particular data set and delivers the particular data set to the second port 27 in the main port control unit 23 as one of the main port data sets. In the similar manner, the selector 43 in the other primary port control unit 25 selects the diagnostic data set from the executing processor unit 144 as the particular data set and delivers the particular data set to the second port 28 in the main port control unit 23 as another of the main port data sets. The selector 31 in the main port control unit 23 is supplied with "00" as the specific primary group number. Therefore, the selector 31 selects that one of the main port data sets which is supplied through the second port 27 as the particular main port data set and delivers the particular main port data set to the data processing portion 17 as the specific diagnostic data set. Thus, the data processing portion 17 can diagnose the system control unit 13.

In the similar manner, the data processing portion can diagnose any one of the diagnosed units.

When it is desired in the information processing system that executing processor units are added, those added executing processor units can be diagnosed by the diagnostic processor 15 by additional use of one or two primary port control units which are similar to the primary control units 24 and 25. For example, when eight (8) executing processor units are desired to be added, two primary port control units are additionally connected to the second ports 29 and 30 in the main port control unit 23. The added executing processor units are connected to similar second ports in the added two primary port control units.

It will be understood that one primary port control unit is added for increase of four or less diagnostic units.

On the contrary, when the four executing processor units 143 through 146 are not used, the primary port control unit 25 is omitted. Then, the other primary port control unit 24 may be omitted and the four diagnosed units 12, 13, 141 and 142 may be directly connected to the second ports 27 through 30, respectively. At that case, the specific group elementary number is supplied to the selector 31.

What is claimed is:

1. In a diagnostic system for diagnosing a plurality of N (N is an integer of at least 2) diagnosed units which implement an information processing system, said plurality of diagnosed units being assigned with different processing unit numbers, respectively, said diagnostic system comprising:
   a diagnostic processor for delivering a specific one of said processing unit numbers and a diagnosis indicating data signal to receive a specific diagnostic data set from a specific one of said diagnosed unit corresponding to said specific processing unit number and for processing said specific diagnostic data set to diagnose said specific diagnosed unit; and
   interface means for delivering said diagnosis indicating data signal to said plurality of diagnosed units and for selecting, as said specific diagnostic data set, one of said diagnostic data sets from said specific diagnosed unit to deliver said specific diagnostic data set to said diagnostic processor by use of said specific processing unit number, wherein said N diagnosed units are classified into $N_1$ ($N/m \leq N_1 < N/m+1$, $N_1$ being an integer and m being an integer of at least 2 but not larger than N) primary port control groups which have different primary port control group numbers, each of said primary port control groups having at least one but not larger than m diagnosed units which are assigned different group elementary numbers, $N_{i-1}$ ($i-1$)-th (i being an integer) order port control groups being classified into $N_i$ ($N_{i-1}/m \leq N_i < (N_{i-1}/m+1)$, $N_i$ being an integer) i-th order port control groups which have different i-th order group numbers, $N_k$ ($N_k = N_i$, $2 \leq N_k \leq m$) k-th order port control groups having different k-th order group numbers when $i = k$, each of said processing unit numbers including said group, elementary number, said primary number, said ($i-1$)-th order group number, said i-th order group number and said k-th order group number;
   said interface means further including $N_1$ primary port control units corresponding to said $N_1$ primary port control groups and each of said $N_1$ primary port control units coupled to elementary diagnosed units in each of said primary port control groups;
   $N_{i-1}$ ($i-1$)-th order port control units corresponding to said $N_{i-1}$ ($i-1$)-th port control groups and being classified into $N_i$ i-th order controller groups corresponding to said $N_i$ i-th order port control groups;
   $N_i$ i-th order port control units each coupled to said ($i-1$)-th order port control units in each of said $N_i$ i-th order controller groups;
   $N_k$ k-th order port control units corresponding to said $N_k$ k-th order port control groups; and
   a main port control unit coupled to said $N_k$ k-th order port control units, said main port control unit being coupled to said diagnostic processor for receiving a pair signal of said specific processing unit number and said diagnosis indicating data signal, said pair signal being delivered from said main port control unit to said diagnosed units through said k-th order port control units, said i-th port control units and said primary port control units, said specific diagnostic data set being delivered from said specific diagnosed unit to said diagnostic processor through one of said primary port control units, one of said (i-1)-th order port control units, one of said i-th order port control units, one of said k-th order port control units, and said main port control unit.

2. A diagnostic system as claimed in claim 1, wherein each of said primary port control units, each of said ($i-1$)-th order port control units, each of said i-th order port control units, and each of said k-th order port control units and said main port control unit have a similar circuit formation which includes a first port for receiving said pair signal and for delivering a selected diagnostic data set, m second ports connected to said first port for delivering said pair signal therethrough and for receiving m diagnostic data sets, and a selector coupled to said m second ports and said first port for selecting one of said m diagnostic data sets as said selected diagnostic data set with reference to said specific processing unit number.

3. A diagnostic system as claimed in claim 2, N being at least 2 but not larger than m, wherein said $N_k$ k-th order port control groups are m groups comprising m different diagnosed units, respectively.

4. A diagnostic system as claimed in claim 2, wherein each of said primary port control units selects a particular one of said diagnostic data sets from said diagnosed units in a primary group with reference to a group elementary number in said specific processing unit number to deliver said particular diagnostic data set, each of said i-th order port control units selecting a particular one of i-th order port data sets delivered from ($i-1$)-th order port control units with reference to an ($i-1$)-th order group number in said specific processing unit number to deliver a particular i-th order port data set, said main port control unit selecting a particular one of main port data sets delivered from k-th order port control circuits with reference to a k-th order group number in said specific processing unit number to deliver said particular main port data sets as said specific diagnostic data set.

* * * * *